(12) United States Patent
Eckardt et al.

(10) Patent No.: US 8,949,167 B2
(45) Date of Patent: Feb. 3, 2015

(54) METHOD AND DEVICE FOR THE QUALITY ANALYSIS OF SYSTEM MODELS

(75) Inventors: Horst Eckardt, München (DE);
Sieglinde Kranz, Germering (DE);
Nikolaus Regnat, München (DE)

(73) Assignee: Siemens Aktiengesellschaft, Munich (DE)

( * ) Notice: Subject to any disclaimer, the term of this patent is extended or adjusted under 35 U.S.C. 154(b) by 420 days.

(21) Appl. No.: 13/296,978

(22) Filed: Nov. 15, 2011

(65) Prior Publication Data
US 2012/0123990 A1     May 17, 2012

(30) Foreign Application Priority Data
Nov. 17, 2010   (DE) .......................... 10 2010 044 039

(51) Int. Cl.
*G06N 5/02*      (2006.01)
*G06F 9/44*      (2006.01)

(52) U.S. Cl.
CPC ....................................... *G06F 8/10* (2013.01)
USPC ......................................................... 706/47

(58) Field of Classification Search
None
See application file for complete search history.

(56) References Cited

U.S. PATENT DOCUMENTS

| | | | |
|---|---|---|---|
| 6,874,146 B1 | 3/2005 | Iyengar | 719/313 |
| 8,099,711 B2* | 1/2012 | Bahrs et al. | 717/105 |
| 2009/0300579 A1* | 12/2009 | Dutta et al. | 717/105 |

OTHER PUBLICATIONS

Gudemann, Kegel, Ortmeier, SysML in Digital Engineering, Proceeding of IWDE '10 Proceedings of the First International Workshop on Digital Engineering, Jun. 2010, pp. 1-8.*
Johnson, Paredis, Burkhart, "Integrating Models and Simulations of Continuous Dynamics into SysML", Proceedings of Modelica Conference 2008 at the University of Applied Sciences Bielefeld, Germany, Mar. 2008, pp. 135-145.*
Hove, Goknil, Kurtev, van den Berg, de Goede, "Change Impact Analysis for SysML Requirements Models Baed on Semantics of Trace Relations", ECMDA Traceability Workshop 9CMDA-TW) 2009 Proceedings, Jun. 2009, pp. 17-28.*
Hause, Thom, "An Integrated Safety Strategy to Model Driven Development with SysML", System Safety, 2007 2nd Institution of Engineering and Technology International Conference on, Oct. 22-24, 2007, pp. 124-129.*
Richards, Stuart, Hause, "Testing Solutions through SysML/UML", from proceedings of 19th Annual International Symposium of INCOSE, Jul. 2009, pp. 1-15.*
"Unified Modeling Language", http://en.wikipedia.org/wiki/unified_modeling_language, Wikipedia, Nov. 17, 2010.
German Office Action; German Patent Application No. 10 2010 044 039.6, 9 pages, Aug. 2, 2011.

* cited by examiner

*Primary Examiner* — Kakali Chaki
*Assistant Examiner* — Walter Hanchak
(74) *Attorney, Agent, or Firm* — King & Spalding L.L.P.

(57) ABSTRACT

A device (100) for the quality analysis of system models (10, 12) has a testing tool (1) that is designed to receive a plurality of system models (10, 12) from a plurality of modeling tools (11, 13), convert it into a unified data model (2) and check it for quality with the aid of unified quality rules (3).

6 Claims, 1 Drawing Sheet

METHOD AND DEVICE FOR THE QUALITY ANALYSIS OF SYSTEM MODELS

CROSS-REFERENCE TO RELATED APPLICATIONS

This application claims priority to German Patent Application No. 102010044039.6 filed Nov. 17, 2010, the contents of which is incorporated herein by reference in its entirety.

TECHNICAL FIELD

The present invention relates to a method and a device for the quality analysis of system models.

BACKGROUND

Nowadays there are a number of modeling tools for system models that work on the basis, for example, of UML ("unified modeling language"). UML is a graphic modeling language for systems specification, construction and documentation. A further modeling language is SysML ("systems modeling language"), which is based on UML and represents a standardized language for modeling complex systems. In SysML, each modeling tool uses its own semantics and classification system to create, represent, manage and store system models generated with the aid of the modeling tool.

Because of the increasing complexity of system models it is necessary to check the quality of system models. This quality check is based on corresponding quality rules that have hitherto been provided in a tool-specific form by each manufacturer of modeling tools. Quality rules of this kind cannot therefore be used directly for the quality analysis of system models relating to other modeling tools.
http://de.wikipedia.org/wiki/Unified Modeling Language— cite note-0#cite note-0

SUMMARY

According to various embodiments, a unified interface for the developer of quality rules can be provided, such that, with the aid of a unified data model, quality rules can be used for system models relating to a plurality of different system modeling tools across the range of tools. As a result, firstly new modeling tools can be incorporated into the existing quality check in a simple manner and secondly, when creating quality rules, it is not necessary to take into account any tool-specific aspects of different modeling tools.

According to an embodiment, a device for the quality analysis of system models, may comprise a testing tool, which is designed to receive a plurality of system models from a plurality of modeling tools, convert it into a unified data model and test it for quality with the aid of unified quality rules.

According to a further embodiment, the unified quality rules can be formulated independently of the plurality of the modeling tools. According to a further embodiment, the data model further may have at least one sub-model that is specific to at least one of the plurality of modeling tools. According to a further embodiment, the testing tool can be further designed to receive a system model from the at least one of the plurality of modeling tools, convert it into the sub-model and check it for quality with the aid of specific quality rules. According to a further embodiment, the unified quality rules may include rules for checking the completeness, the complexity, the language conformity, the model consistency and/or the statistical system model data. According to a further embodiment, the specific quality rules may include rules for checking the completeness, the complexity, the language conformity, the model consistency and/or the statistical system model data of system models.

According to another embodiment, a method for the quality analysis of system models, may comprise the steps: receiving of a system model from one of a plurality of modeling tools in a testing tool; conversion of the system model into a unified data model; and checking the quality of the system model with the aid of unified quality rules in the data model, the unified quality rules being independent of the plurality of modeling tools.

According to a further embodiment of the method, the unified quality rules can be formulated independently of the plurality of the modeling tools. According to a further embodiment of the method, the method may further comprise the further steps: receiving of a further system model from at least one of the plurality of modeling tools; and conversion of the further system model into a sub-model of the data model, wherein the sub-model is specific to the at least one of the plurality of modeling tools. According to a further embodiment of the method, the method may further comprise: checking the quality of the further system model with the aid of specific quality rules that are specific to the at least one of the plurality of modeling tools. According to a further embodiment of the method, the unified quality rules may include rules for checking the completeness, the complexity, the language conformity, the model consistency and/or the statistical system model data. According to a further embodiment of the method, the specific quality rules may include rules for checking the completeness, the complexity, the language conformity, the model consistency and/or the statistical system model data of system models.

BRIEF DESCRIPTION OF THE DRAWINGS

Various embodiments and variants are now described in further detail with reference to the accompanying drawings, wherein.

DETAILED DESCRIPTION

According to various embodiments, a device for the quality analysis of system models may use a testing tool that is designed to receive a plurality of system models from a plurality of modeling tools, convert them into a unified data model and test it for quality using unified quality rules.

Advantageously, the device may use unified quality rules that are formulated independently of the plurality of the modeling tools. As a result thereof, the unified quality rules can be used across the range of tools.

According to one embodiment, the device encompasses in the data model at least one sub-model that is specific to at least one of the plurality of modeling tools. The device can then be designed preferably so as to receive a system model from the at least one of the plurality of modeling tools, convert it into the sub-model and test it for quality with the aid of specific quality rules. Advantageously, it can be possible in this way to generate quality rule sets that are relevant only to a specific class of system models or only to specific modeling tools.

Advantageously, the unified and specific quality rules may include rules for checking the completeness, the complexity, the language conformity, the model consistency and/or the statistical system model data.

According to a further embodiment, a method for quality analysis of system models is provided. It encompasses the following steps:
receiving of a system model from one of a plurality of modeling tools in a testing tool;
conversion of the system model into a unified data model;
and checking the quality of the system model with the aid of unified quality rules in the data model, said unified quality rules being independent of the plurality of modeling tools.

The embodiments and further developments described can be used in any combination with one another insofar as this is practical. Further possible embodiments, developments and implementations also include combinations of features of various embodiments described with reference to the exemplary embodiments either in the aforementioned or hereafter that have not been mentioned explicitly.

The accompanying drawings are intended to facilitate a further understanding of the embodiments. They illustrate embodiments and, together with the description, serve to explain the principles and concepts underlying the various embodiments. Other embodiments and many of the advantages that have been described will become apparent from the drawings. The elements of the drawings are not necessarily shown true to scale with one another. Like reference signs denote like components or components with a similar effect.

Figure 1:
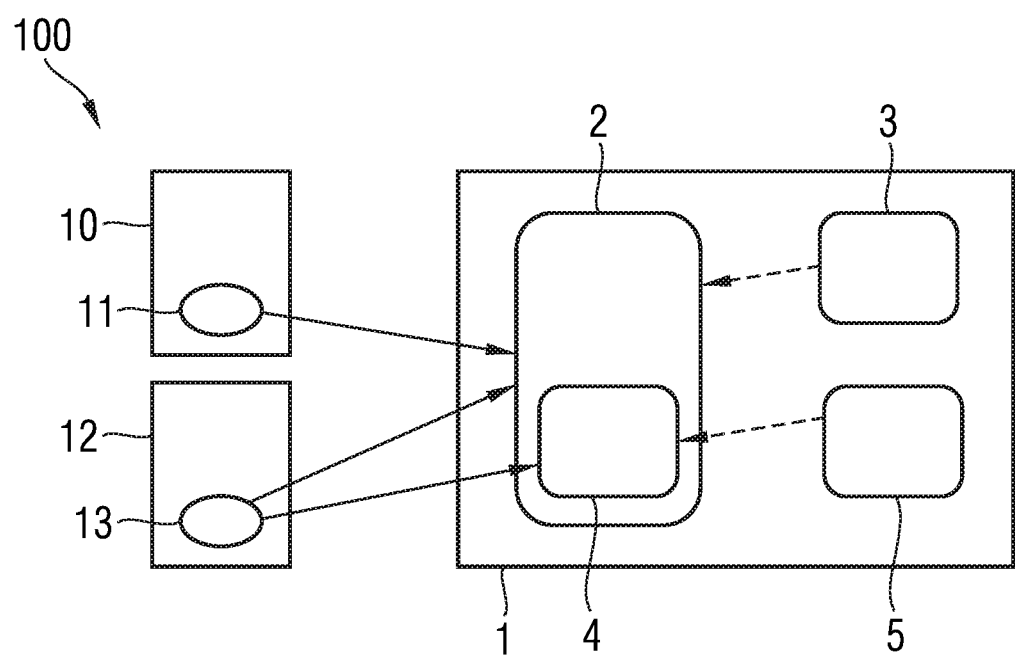
FIG. 1 shows a diagram of a device for the quality analysis of system models according to one embodiment.

FIG. 1 shows a diagram of a device 100 for the quality analysis of system models according to one embodiment. The device 100 includes a testing tool 1 that contains a data model 2.

The data model 2 is a unified data model that can map data relating to a plurality of modeling tools 10, 12. For this purpose the testing tool 1 receives a first system model 11 that has been generated in a first modeling tool 10 of a plurality of modeling tools, and converts the first system model 11 into the data model 2 according to predefined conversion rules. For this purpose it is possible to use first conversion rules that describe a conversion of system models 11 specific to the first modeling tool 10. The converted system model 11 is then provided in a unified format according to the data model 2.

The testing tool 1 is able to receive a second system model 13 that has been generated in a second modeling tool 12 relating to the plurality of modeling tools and convert it into the data model 2 according to predefined conversion rules. For this purpose it is possible to use second conversion rules that describe a conversion of system models 13 specific to the second modeling tool 12. The converted system model 13 is then likewise provided in the unified format according to the data model 2. Of course, the number of modeling tools in FIG. 1 is only limited to two by way of example, and any other number of modeling tools can equally well be mapped in the data model 2.

As a result of the conversion of the system models 11 and 13 into a unified data model 2, the converted system models 11 and 13 are congruent in structure, design, semantics, linking system and other meta-data and can be subjected to a unified quality analysis. For this purpose, the testing tool 1 can use quality rules 3 with the aid of which the converted system models 11 and 13 can be tested for their quality. The quality rules 3 can be formulated independently of the respective modeling tools 10, 12 and can be based on the structure and semantics of the data model 2.

After a quality analysis using the unified quality rules 3, the testing tool 1 is able to issue analytical results for the system models 11 and 13. The quality analysis can include rules for checking the completeness, the complexity, the language conformity, the model consistency, the statistical system model data or similar quality criteria. Both content-related quality aspects, such as, for example, checking that the purpose of the model has been met or checking the legibility of the system model, and also formal quality aspects such as, for example, linguistic correctness or consistent use of terminology, may be used to evaluate the quality of the system models.

In one embodiment, provision can be made for the data model 2 to include a sub-model 4 that matches only one group of modeling tools. In the example in FIG. 1, the sub-model 4 matches the modeling tool 12, which means that the sub-model 4 contains structural relationships that are only relevant to the system models 13 generated by the modeling tool 12. System models of other modeling tools such as, for example, the system model 11 of modeling tool 10, cannot be converted into the sub-model 4. Here, the group of modeling tools that are depicted above the sub-model 4 may include one or a plurality of modeling tools. In particular, tool-specific extensions of the data model 2 can be integrated in the sub-model 4.

For the sub-model 4, in addition to the quality analysis using the unified quality rules 3, it is also possible to carry out a more comprehensive quality analysis using tool-specific quality rules 5 that are customized for system models generated using one of the group of modeling tools and that are able to take into account tool-specific extensions of the data model 2.

The testing tool 1 offers the advantage that when there are changes to modeling tools, for example through the appearance of new versions of the modeling tools, in the worst case scenario it is only the conversion rules in the data model 2 that have to be matched to the changes. The unified quality rules 3, and likewise, where necessary, the tool-specific quality rules 5, revert respectively to the data model 2 or the sub-model 4 in which no changes take place, and they can therefore continue to be used unchanged even when there are changes to the modeling tools. This dispenses with the unnecessary effort involved in updating the quality rules.

Furthermore, through the conversion of system models 11, 13 of various modeling tools 10, 12 into a unified data model, the comparability of quality analysis results can be increased since the system models can be analyzed using unified quality rules.

Advantageously, provision can be made for the system models 11, 13 of various modeling tools 10, 12 to be sent to the testing tool in a unified format, in XML format for example, or in an XMI ("XML Metadata Interchange") format. XMI is a standardized XML-based exchange format for data exchange between modeling tools. However, provision can also be made for the system model data to be sent to the testing tool in the proprietary format used in the respective modeling tool.

Figure 2:
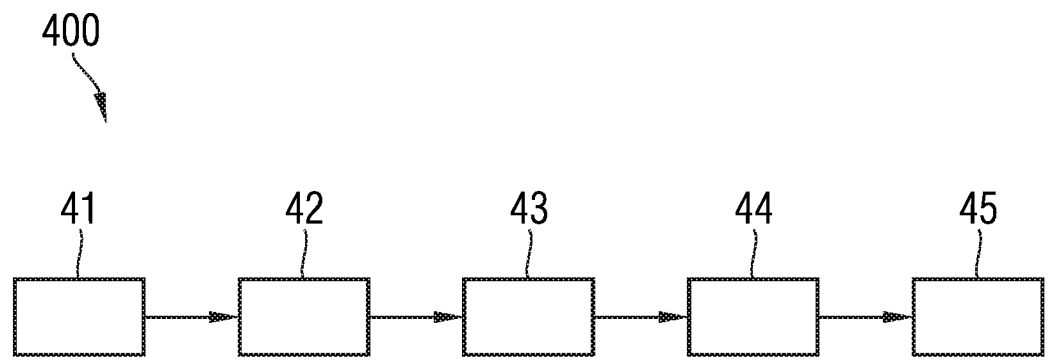
FIG. 2 shows a diagram of a method for the quality analysis of system models according to one embodiment.

FIG. 2 shows a diagram of a method 400 for the quality analysis of system models according to one embodiment. In a first step 41, a system model is received from one of a plurality of modeling tools in a testing tool, the system model having been generated in accordance with the creation rules relating to the respective modeling tool.

In a second step 42 the system model is converted into a unified data model. The conversion is able to ensue through conversion rules allocated to the respective modeling tools. Thereupon, the converted system model is available in a unified structural and semantic format specific to the data model, without the content of the system model having been changed.

In a third step 43 a quality check of the system model ensues in the data model with the aid of unified quality rules, said unified quality rules being independent of the plurality of the modeling tools. Here, the quality rules can be structured in a similar manner to the quality rules described in relation to FIG. 2 and can be capable of detecting errors and/or evaluating content-related or formal flaws in the system model. The quality rules operate at a data model level and not at a modeling tool level.

Provision can be made for a further system model of at least one of the plurality of modeling tools to be received in a fourth step 44 and for the further system model to be converted into a sub-model of the data model in a fifth step 45, said sub-model being specific to at least one of the plurality of modeling tools. In addition to the quality analysis of the system model in the data model, the sub-model can be used for analyzing specific system model data with the aid of specific quality rules that are not shown in the unified data model for all the modeling tools.

Although the invention has been described with reference to system models, in the context of the application the term system models also includes models with a similar design to system models, such as process models, business models, domain models and suchlike.

What is claimed is:

1. A device for the quality analysis of system models, comprising:
    a testing tool embodied in non-transitory computer-readable media and executable by a processor, the testing tool including:
        conversion rules configured to:
            receive a plurality of system models from a plurality of modeling tools from plurality of different modeling tool manufacturers,
            using conversion rules specific to each of the plurality of modeling tools to convert the plurality of system models from the plurality of modeling tools from the plurality of different modeling tool manufacturers into a unified data model,
            wherein the unified data model defines a combined model comprising a plurality of sub-models, wherein each of the sub-models is matched to only a respective subset of the plurality of modeling tools from a subset of the plurality of different modeling tool manufacturers, and includes structural relationships relevant only to the respective subset of modeling tools, such that only system models from the respective subset of modeling tools are convertible into the respective sub-model,
        unified testing rules independent of the plurality of modeling tools and configured to test the unified data model for quality, and
        for each of the plurality of sub-models, specific testing rules specific to the respective subset of modeling tools matched to the respective sub-model and configured to test the respective sub-model for quality.

2. The device according to claim 1, wherein the unified quality rules include rules for checking at least one of the completeness, the complexity, the language conformity, the model consistency and the statistical system model data.

3. The device according to claim 1, wherein the specific testing rules include rules for checking at least one of the completeness, the complexity, the language conformity, the model consistency and the statistical system model data of system models.

4. A method for the quality analysis of system models, comprising the steps:
    receiving at a testing tool a plurality of system models from a plurality of modeling tools from the plurality of different modeling tool manufacturers;
    conversion of the plurality of system models from the plurality of modeling tools from the plurality of different modeling tool manufacturers into a unified data model using conversion rules specific to each of the plurality of modeling tools, wherein the unified data model defines a combined model comprising a plurality of sub-models, wherein each of the sub-models is matched to only a respective subset of the plurality of modeling tools from a subset of the plurality of different modeling tool manufacturers, and includes structural relationships relevant only to the respective subset of modeling tools, such that only system models from the respective subset of modeling tools are convertible into the respective sub-model;
    using unified testing rules formed independent of the plurality of modeling tools, checking the quality of the unified data model, and
    for each of the plurality of sub-models, using specific testing rules respective subset of modeling tools matched to the respective sub-model and configured to test the respective sub-model for quality.

5. The method according to claim 4, wherein the unified quality rules include rules for checking at least one of the completeness, the complexity, the language conformity, the model consistency and the statistical system model data.

6. The method according to claim 4, wherein the specific testing rules include rules for checking at least one of the completeness, the complexity, the language conformity, the model consistency and the statistical system model data of system models.

* * * * *